United States Patent [19]

Heywang et al.

[11] 3,857,074
[45] Dec. 24, 1974

[54] ELECTRICAL CAPACITORS AND METHOD OF MAKING SAME

[75] Inventors: Hermann Heywang; Manfred Kobale, both of Munich Karl-Heinz Preissinger, Taufkirchen; Dietrich Ristow, Neubiberg; Ulrich Wehnelt, Starnberg, all of Germany

[73] Assignee: Siemens Aktiengesellschaft, Berlin and Munich, Germany

[22] Filed: Sept. 19, 1973

[21] Appl. No.: 398,864

[30] Foreign Application Priority Data
Sept. 27, 1972 Germany............................ 2247260

[52] U.S. Cl.............. 317/258, 29/25.42, 29/630 B, 156/257, 264/22, 264/249
[51] Int. Cl............................................. H01g 1/14
[58] Field of Search........ 29/25.42, 630 B; 317/242, 317/258, 260, 261; 264/22, 249; 156/257, 275

[56] References Cited
UNITED STATES PATENTS
2,745,931 5/1956 Heibel................................ 264/249
2,752,663 7/1956 White............................... 29/630 B
3,067,488 12/1962 Bennett............................ 29/25.42
3,134,059 5/1964 Rayburn......................... 317/261 X
3,243,675 3/1966 Rayburn............................. 317/260
3,431,473 3/1969 Cormier......................... 317/242 X
3,724,043 4/1973 Eustance........................ 317/255 X FOREIGN PATENTS OR APPLICATIONS
595,657 12/1947 Great Britain...................... 317/261
807,480 1/1959 Great Britain...................... 317/261

Primary Examiner—E. A. Goldberg
Attorney, Agent, or Firm—Hill, Gross, Simpson, Van Santen, Steadman, Chiara & Simpson

[57] ABSTRACT

An electrical capacitor having a stack of at least two metal layers separated by a dielectric layer disposed between a pair of cover foils with the metal layers being offset in a staggered relationship characterized by a pair of connecting wires embedded in one of the cover foils with at least one portion of each wire projecting through the cover foil and in electrical contact with the metal layer disposed therebeneath. In embodiments, the wires may have a serpentine shape which may be formed during the method of fusing the wires into the cover layer or foil which shape provides portions projecting through the metal layer to be fused to the opposite cover foil while adjacent portions of the wires form the electrical connection.

35 Claims, 11 Drawing Figures

Patented Dec. 24, 1974  3,857,074

Patented Dec. 24, 1974  
3,857,074

ELECTRICAL CAPACITORS AND METHOD OF MAKING SAME

BACKGROUND OF THE INVENTION

1. Field of the Invention

The present invention relates to electrical capacitors having electrodes in the form of metal layers separated by dielectric layer which electrodes are disposed between a pair of synthetic resin foils and which electrodes are electrically connected to connecting wires which are fused into the synthetic resins and the method of making the capacitor.

2. Prior Art

In the German Offendegungsshrift No. 2,037,426, a wound capacitor is described in which connecting wires are fused into the end faces of the capacitor and are connected by alloy formations to the aluminum foils which serve as the capacitor electrodes. However, the construction described in this specification is not suitable for the contacting of metal layers applied by vapor deposition, because due to the limited resistance to thermal loading of thermoplastic dielectric foils, these metal layers cannot be made sufficiently thick to enable the pint contacts produced with this construction to ensure a sufficiently reliable and low-ohmic contact.

German Patent Specification No. 976,844 describes the contacting of an aluminum foil, which is to be employed as a capacitor electrode and is covered with a lacquer layer by using a tinned copper wire. The copper wire is pressed by electrodes onto the aluminum foil and is heated by the passage of electric current to firmly join the wire to the aluminum foil through the lacquer layer. In this arrangement, the function of the thin lacquer layer is fundamentally that of heat insulation in relation to a base. The stability of the connection is, of course, dependent upon the thickness of the aluminum foil.

In German Specification No. 514,902, a capacitor is described which has a mica dielectric with metal coatings vaporized onto both sides. At opposite edges of the capacitor, the two coatings leave exposed free edge zones onto which connection terminals can be clamped. Capacitors having a desired capacitance value can be removed from a longer mother capacitor of the abovementioned type. The contacting of a capacitor of this kind by means of soldered wires cannot be accomplished with an adequate mechanical stability, since this stability is determined solely by the adhesive strength of the thin metal coatings on the substrates on which the coatings are deposited.

SUMMARY OF THE INVENTION

It is an object of the present invention to provide an electrical capacitor which is simple to handle, can have small dimensions and low capacitance values, and contains synthetic resin dielectric layers and thin, preferably regenerably thin, metal coatings. The capacitor has connection wires which are connected to the metal coatings or layers, which preferably is limited to one layer for each polarity, in a mechanically reliable and electrically conductive manner, without the necessity of providing end contact layers.

To accomplish these objects, the present invention provides a capacitor and method of making the capacitor which capacitor comprises at least two metal layers, a dielectric layer of synthetic resin material interposed between each adjacent pair of metal layers, said metal and dielectric layers being substantially flat and arranged between a first and second outer cover foil to form a stack with each of said metal layers, which serves as one electrode of the capacitor, extending to one edge of the stack but not to the opposite edge so as to leave a metal-free edge zone at said opposite edge, and each of said metal layers, which serve as the other electrode of the capacitor, extending to said opposite edge but not to said one edge of the stack, so as to leave a metal-free edge zone at said one edge, and a connecting wire extending longitudinally on said first cover foil along each of said metal-free edge zones, at least specific points on the length of said wires being fused through said first cover foil and into electrical contact with the metal layer in the edge zone so that the wire is mechanically stably secured therein and is in an electrically conductive connection with the metal layer extending into said edge zone therebeneath.

DESCRIPTION OF THE PREFERRED EMBODIMENTS

Figure 1:
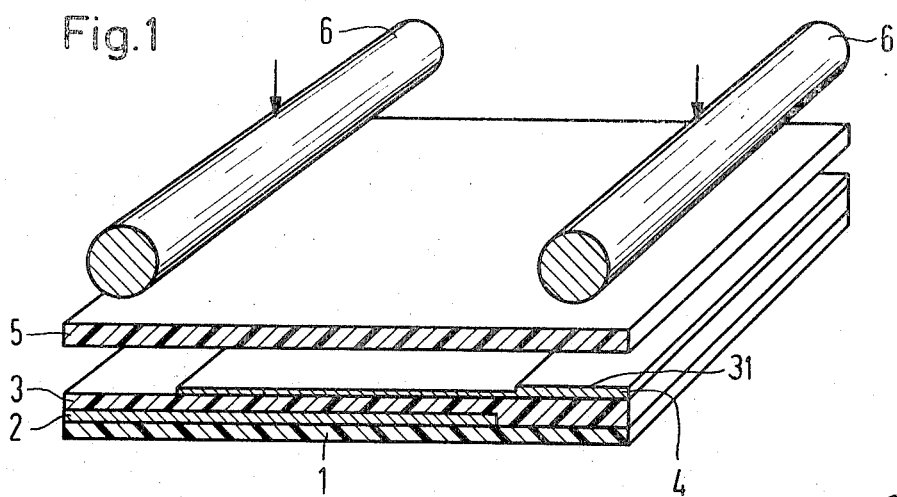
FIG. 1 is a schematic, partially exploded view of a capacitor in accordance with the invention before contacting.
Figure 2:
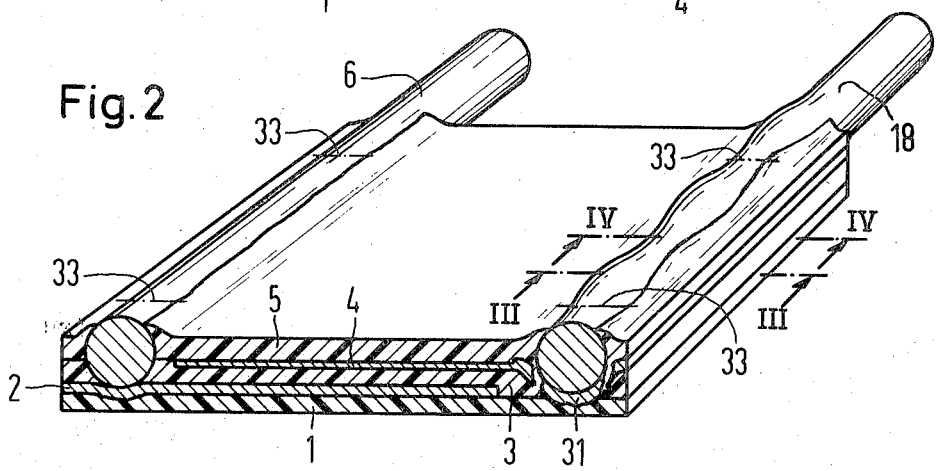
FIG. 2 is a schematic perspective view of a capacitor in accordance with the invention, partly in section; showing the use of two different connecting wires.

The principles of the present invention are particularly useful in making and providing a capacitor illustrated in FIG. 2. To form the capacitor of FIG. 2, a stack illustrated in FIG. 1 is formed by a capacitor foil having a first covering or cover foil 1, a first non-regenerable metal layer 2, a thin dielectric layer 3 and a second metal layer 4 having a regenerable portion and a reinforced edge portion 31. The layers and foils may be firmly connected to one another. Over this layer sequence, which represents a capacitor foil, there is arranged a thermoplastic covering or cover foil 5 to complete the stack. Above the foil 5 a pair of connecting wires 6 are positioned. A capacitor in accordance with the invention is formed by applying heat and pressure to the connecting wires 6 in the direction of the arrow to fuse the wires through the cover foil 5, the dielectric layer 3 and one of the coatings 2 and 4, into the first covering foil 1 (FIG. 2).

As illustrated in FIG. 2, in addition to the layers 1 to 4 which correspond to those shown in FIG. 1, there is also indicated the pressure points 33 of the electrodes used to produce the fusion of the connecting wires. As shown, the lower covering foil 1 is considerably thinner than the upper foil 5. One connecting wire 6 is approximately straight, whereas the other connecting wire 18 is approximately sinusoidal.

Figure 3:
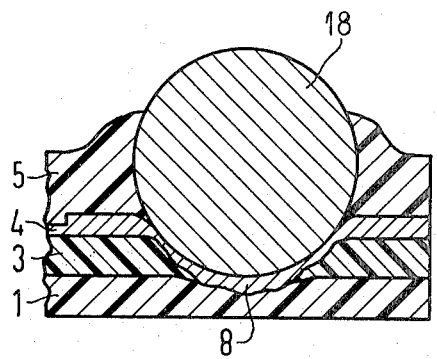
FIG. 3 is a section taken along the line III—III of FIG. 2.

As shown in FIG. 3, the wire 18 is fused through the covering foil 5 into the coating 4, the dielectric 3 and the first covering foil 1. The metal coating 4 forms with the wire 6 an alloy zone 8 which is integrally connected to the remaining part of the coating 4.

Figure 4:
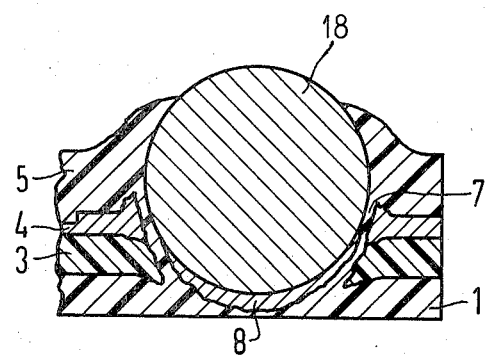
FIG. 4 is a section taken along the line IV—IV of FIG. 2.

FIG. 4 shows a section through the same wire at a different point where the wire is embedded a greater amount into the lower covering foil 1 during the step of fusing. The alloy zone 8 is at this point not electrically conductively connected to the coating 4. Between the wire 18 and the coating 4 gaps 7 filled with synthetic resin material have formed, which gaps separate the wire 18 and the alloy zone 8 from the coating 4. The gaps 7 have been produced by the synthetic resin which has been liquefied and forced upwards as the resin in the softened zone can easily elude the pressure exerted by the wire 18.

As illustrated, at least one of the cover foils has a sufficient thickness to provide the mechanical resistance or strength which is necessary for handling the capacitor. In addition, the capacitor exploits the advantages of synthetic resin materials as dielectrics having capacitance values of the order of less than 1 pF. The capacitor can be made by a method which can be easily automated.

A particularly simple construction of capacitor, according to the principles of the invention, is one in which both cover foils 1 and 5 are of thermoplastic material, and the wires are fused, at least at specific points, through the cover foil 5, the dielectric layer 3 or layers and the coatings or layers to be contacted, and into the other cover foil, 1, and in which the wires such as 6 and 18 are mechanically stably connected to the two covering foils, the dielectric layer or layers and the coatings which layers and foils are held together solely by this means.

If a capacitor of this type has to have relatively thick covering foils which are consequently difficult to process, or a relatively thick dielectric layer is required, then it is advantageous to use a construction in which a dielectric foil, which carries the two metal layers is arranged or interposed between the two covering or cover foils. The metal layers can be provided on the dielectric layer by a vapor depositing and are arranged in the overlapping relationship to provide a zone free of metal on one edge of one side with the zone free of metal for the other side being at the opposite edge.

If a capacitor of this kind is to be regenerable, at least one of the coatings or layers should have both a regenerably thin, capacitive zone and a reinforced contacting zone. Coatings of this kind, when used in the present invention, can be thicker than the regenerable coatings of capacitors of the conventional type. Sufficient regenerability is still ensured if the coatings consist of aluminum and if each coating of one polarity possesses a surface conductivity of approximately 15 mho and each coating of the other polarity has an edge region or contacting zone which zone has a surface conductivity of approximately 15 mho, and a capacitive zone with a surface conductivity of at most 3 mho.

Marking of the capacitors is expediently applied to at least one of the covering foils.

The thickness of each of the two cover foils is conveniently in the range of 20 $\mu$ to 500 $\mu$. It is generally advantageous to select a different thickness for each of the two cover foils. One cover foil has a greater thickness to produce the mechanical stability necessary for the handling of the capacitor and a reliable mechanical securing of the wires. The other cover foil need be no thicker than is necessary for the production and the mechanical protection of the capacitor.

Connecting wires made of tinned copper or tinned bronze are particularly suitable for the alloy formation with the metal coatings or layers. They may conveniently be arranged to lie at a distance from one another which corresponds to the grid scale of a printed circuit. The regenerability of this type of capacitor is improved by arranging a layer which serves to improve regenerability, between at least one of the metal layers or coatings and the cover foil arranged thereupon. This layer does not lie within the electric field of the capacitor.

A predetermined depth of penetration of the connecting wires can be ensured if the two wires are fused from one side into a thermoplastic cover foil which possesses a lower short-term thermal resistance then the cover foil on the other side. The lower short-term thermal resistance may be due to the use of a material for the one cover foil which possesses a lower melting point than the material of the other foil or may be due to the fact that, although the one cover foil possesses a higher melting point than the other, it nevertheless possess a lower short-term resistance. This is the case where the one cover foil is made of polyethylene terephthalate and the other of polysulphone. It would also be the case if the cover foil having the higher short-term thermal resistance is composed of a thick layer of a material exhibiting a relatively low short-term thermal resistance and at least one thinner layer applied to the inner face of the latter which exhibits a higher short-term thermal resistance. This is of particular advantage in the case of a relatively thick cover foil. In this case, the thick layer can consist of the material of the cover foil which has a lower short-term thermal resistance. The thin layers have a relatively high short-term thermal resistance need only be approximately 1 $\mu$ thick. It may conveniently consist of either a polysulphone with a melting point of at least 210°C (empirical formula $[C_{27}H_{22}O_4 S]_n$), or polyhexafluoropropylene. A polysulphone of this kind may have, for example, a melting point of 210°C, a freezing point of 190°C and a permanent stability point of 165°C.

By the term "short-term thermal resistance" as used herein is meant the resistance which temporarily opposes the sinking of a heated wire into the foil in question. The short-term thermal resistance can, for example, be stated in seconds/mm, when the other parameters (e.g., pressure, heating, construction of apparatus) are maintained constant.

A particularly reliable mechanical and electrical connection between the connecting wires and the metal coatings may be achieved if the connecting wires are deformed in the zone in which they are contacted with the metal coatings of the capacitor either with or without a change in the cross-section of the wire. Deformations without changes in cross-section are for example bends in the wire. If such bends are arranged parallel to the surface of the metal coatings or layers, the mechanical resistance will be increased. If the bends are arranged perpendicular to the surface of the metal coatings, so that in places they break through the coatings, the bends will provide a mechanical and electrical connection to the coatings which is particularly good owing to the nature of such ruptures through the coatings. Ruptures of this kind have zones in which the part of the coating which is alloyed to the connecting wire is laterally separated from the remainder of the coating (see FIG. 4). In the longitudinal direction of the wire, as the distance from the center of the bend increases in the longitudinal direction of the wire, a zone is reached in which the coating is still alloyed to the wire and, therefore, electrically conductively and mechanically stably connected thereto, and there is no longer any lateral separation of the alloyed parts of the coating from the remainder thereof. Thus, a satisfactory electric connection exists between the wire and the coating in these zones. If more of these zones are provided on a connecting wire, the electrically conductive connection between the wire and the metal coating is improved.

Even a wire, which is approximately straight, will possess such a connection to the metal coating or layer at its beginning and/or its end, and the intermediate part of the wire can exhibit an electrically conductive connection between the coating and the connecting wire via individual bridges between the wire and the coating or via separated edges of the coating which are flush with the wire. This arrangement is quite suitable for some applications, but it is not very suitable for higher current loads. In such cases, it is expedient to provide the wire with bends which have an undulating shape and in places pass through the coatings which are to be contacted. A particularly good mechanical and electric connection between the connecting wires and the coatings is achieved if the connecting wires are curved helically or spirally in the zone in which they are in contact with the coatings.

A simple connection between the connecting wire and the metal coating which connection exhibits relatively large zones where good contacting is achieved, can be obtained if, the connecting wires are at least at two points pressed through the coatings which are to be contacted, and are fused into the other cover foil, and if the connection wires are, at least at one position between these two points, fused only to the first metal coating to be contacted. This may be advantageously achieved in a capacitor in which the connecting wires are tinned selected from a group consisting of nickel-silver (pakfong) bronze, or copper wires having a diameter of approximately 0.7 mm and are at least at two points pressed through the coatings to be contacted, and are fused into the other cover foil, and if the distance between adjacent points is approximately 2 mm. This type of capacitor construction may also be equally advantageously achieved if the connecting wires are made of tin or aluminum bronze having a relatively low melting point and have a diameter of more than 0.7 mm, if the connecting wires are pressed through the coatings to be contacted in at least two points and are fused into the other cover foil, and if the distance between adjacent points is more than 2 mm. A particulary good connection between the connecting wire and the metal coating, having particularly large contacting zones, is obtained if the connecting wires are pressed through the coatings to be contacted at more than two points and are fused into the other cover foil, and if the perpendicular projection of a connecting wire onto a plane which runs parallel to the fusion zone and which lies perpendicular to the coatings to be contacted is in the form of a more or less sinusoidal curve.

Connecting wires, which, in the region of the fused-in zones, possess an embossed profile which is of undulating form in the longitudinal direction of the wire and which profile is associated with a change in the cross-section of the wire, have the advantage that the capacitor exhibits contacting zones of the abovementioned type with the length and mutual distance between zones being independent of the wire thickness. This is particularly advantageous if a line of such contacting zones is to be produced, and if the individual capacitors being spaced at short intervals from one another. In order to make use of this type of profile to achieve a satisfactory contacting, it is necessary that the fused-in parts of the connecting wire extending furthest into the stack should be fused into the cover foil which is on the opposite side or face of the stack and that the points, which do not extend so far into the stack lying between the parts previously referred to, should only be fused-in as far as the first coating to be contacted. Particularly long zones of good contacting are possible with a sinusoidal profile. The impressed undulating profile of the wire advantgeously has a wavelength of between 0.5 and 3 mm. The profile depth is advantageously greater than the sum of the foil thickness so that all the foils can be used to increase the mechanical stability. The profile depth must be at least sufficient so that, when all the tolerances of the foils and of the connecting wires are taken into consideration, the parts of the connecting wire which are fused-in furthest are fused through the coatings to be contacted and into the covering foil on the opposite face of the stack and the points of the wire, which penetrate least and lie between these parts, are fused-in only as far as the first coating which is to be contacted. Consequently the profile depth of the connecting wires advantageously lies in the range between 50 $\mu$ and 500 $\mu$. A range of between 0.3 and 1.5 mm is advantageous for the diameter of the connecting wires.

A capacitor of relatively low thickness can be obtained if it is formed with a thinnner cover foil provided with metal coatings and dielectric layers and a thicker, uncoated cover foil with the connecting wires being fused into the uncoated cover foil. This foil provides the capacitor with stability, and provides the connecting wires with a good mechanical anchorage, whereas the thinner foil only needs to possess the thickness necessary to protect the capacitor from the mechanical stresses which occur during use. Such a capacitor can be produced from stack, which comprises cover foil of approximately 50 $\mu$ thickness to which are applied alternately metal layers and dielectric layers having total thickness of only a few $\mu$, (e.g. 2 to 10 $\mu$), and an overlying foil of approximately 100 $\mu$ thickness, and connecting wires possessing a diameter of 0.8 mm and an undulating profile having a profile depth of approximately 250 $\mu$.

The capacitors of the present invention can have several metal coatings or layers of identical polarity, if these are separated from one another by dielectric layers and/or further thermoplastic insulating layers, if the metal layers all extend to one edge of the cover foils but not to the other, and if the noncapacitive zones of the metal layers of the same polarity are penetrated by one common connecting wire which is connected in a mechanically stable and electrically conductive manner to all the metal layers of the same polarity by alloy formation. In this manner, three metal coatings or layers of the same polarity may be contacted by one common connecting wire, and a thickness of 50 $\mu$ consisting perhaps of a dielectric layer and/or a further insulating layer can easily be processed.

If the dielectric layers and metal layers take the form of synthetic foils metalized on one side, during contacting in accordance with the invention, air gaps will be formed above the coatings or layers which air gaps promote the regeneration process mainly by the supply of oxygen. If, instead of the dielectric layers, carrier foils are used, which foils are each coated with two oppositely poled metal layers together with an interlying thin dielectric layer, it is possible to contact six metal layers in accordance with the invention.

In order to provide a protection against both moisture and the effect of organic solvents, and in order to increase the mechanical stability of a capacitor according to the invention, edge zones of the dielectric foils may be welded to one another in such a way that a mechanically stable connection of all the layers one to another is formed. A welding seam of this type is preferably so contrived as to be water-tight.

If a capacitor according to the invention is to have particularly low capacitance values, it is advisable to use a form of construction which comprises two uncoated cover foils between which foils is arranged a dielectric foil which has a thickness in the range of 2 to 200 $\mu$, and which has its two sides provided with mutually displaced metal coatings or layers which are provided by a vapor deposition process.

A further reduction in the capacitance and an increase in the dielectric strength can be achieved by the use of an inner series connection in which blind coatings and contacted coatings overlap one another. In order to produce capacitors having capacitance values of the order of magnitude of 1 pF, a capacitor can be used which contains as dielectric foil, a polypropylene foil of 100 $\mu$ thickness which is provided on both sides with metal coatings or layers and the cover foils have thicknesses in the range of 50 to 300 $\mu$.

If relatively heat-sensitive dielectrics are to be used, in particular thin dielectric layers of heat-sensitive dielectric materials (this being advantageous for the production of relatively high capacitances), the capacitor may conveniently have cover foils which are metalized on one side by vapor deposition, a dielectric layer, which is relatively heat-sensitive being arranged between the metal coatings or layers and which dielectric layer has not been metalized. This heat-sensitive dielectric layer may advantageously be made of a lacquer layer which is not self-supporting and is applied to one of the metal coatings or layers. A capacitor provided with a first cover foil, which is a carrier foil provided with a metal coating or layer, a dielectric foil metalized on one side and joined to the first cover foil, and a second unmetalized cover foil has the advantages that the dielectric foil need only possess a heat resistance sufficient to withstand the vapor deposition of a metal layer thereon and that there is no air gap between the coatings or layers.

A capacitor of this type in which the metal coatings or layers and the dielectric layer are connected to one of the cover foils by locking the materials together, and in which a dielectric layer is used which is thin in comparison with the first cover foil and which possesses a linear coefficient of heat expansion which differs from that of the carrier or cover foil, has the advantage of a temperature coefficient $TK_c$ which may be influenced by choice of the carrier foil. For example, after connection to ferrite coils, if a low temperature response of the resonance frequency is desired, a $TK_c$ of between $-150 \times 10^{-6}$ /K and $-250 \times 10^{-6}$ /K is desirable. Using polyethylene terephthalate as the carrier foil and polyphenylene oxide as the dielectric, a $TK_c$ of $-220 \times 10^{-6}$ /K is obtained.

A capacitor with an increased mechanical resistance and an improved anchorage of the connecting wires can be obtained by the use of one or more synthetic resin elements which extend transversely to the connecting wires and are fused to the cover foil to encase the connecting wires. The thickness of this type of synthetic resin component is expediently in the range of 0.2 to 1 mm. Such a construction can advantageously be obtained if two cover foils which have a thickness of 20 $\mu$ and at least one of these foils being provided with the metal layers and dielectric layers and a synthetic resin component having a thickness of 500 $\mu$ are provided in a stack arranged and the entire stack is welded at its edges ultrasonically. Such a construction has the advantages that due to the use of a thin carrier foil, a reduction in volume is achieved in the coating apparatus, and loner foil strips can be processed in one operation, and that the connecting wires are more securely anchored with respect to tension forces perpendicular to the foil plane than in a construction in which such a synthetic resin component is not used an the connecting wires are fused through a thick covering foil.

A capacitor in which the dielectric consists of a completely fluorinated hydrocarbon possesses the advantage of being resistant to organic solvents. It is advisable to select the material of the cover foil from a group of materials consisting of polyethylene terephthalate, polysulphone, polycarbonate, and polystyrene group. In order to increase the adhesion of the connecting wires, it is advisable for at least one of the cover foils (or the above-mentioned synthetic resin component when used) to consist of polyethlene terephthalate, whilst the outer cover foil may consist of any of the above-mentioned materials. An embodiment which is mechanically stable and relatively simple to produce is one in which one cover foil has a thickness of 50 $\mu$ and consists of one of the above-mentioned materials and the other cover foil has a thickness of 190 $\mu$ and consists of polyethylene terephthalate A first metal layer, a dielectric layer, which consists of polyphenylene oxide and is approximately 1 $\mu$ thick, and a second metal layer are applied to the 50 $\mu$ thick cover foil, and the connecting wires are fused through the 190 $\mu$ cover foil, through the dielectric layer and through a respective metal layer into the 50 $\mu$ cover foil. Such a construction enables capacitance values of the order of 1 nF to be obtained in an advantageous manner. A particularly favorable anchorage of the connecting wires is produced as a result of the wires being embedded in a covering foil of polyethylene terephthalate. If both cover foils consist of polyethylene terephthalate, one of the connecting wires can advantageously be fused through both cover foils. A construction which is particularly suitable for this purpose is one in which both cover foils have an equal thickness. A particularly uniform and precise arrangement of the connecting wires relative to the surface of one of the cover foils nases is achieved if one of the connecting wires is provided with one or a plurality of base elements and these base elements are fused through all the layers of the capacitor. These base elements can also serve for the mechanical fixing of the connecting wires if they are connected in a mechanically stable fashion to plates which are placed upon the latter. The plates can advantageously be made of metal with the connecting wires being fused into the plates. Tin or tin solder or a surface-tinned metal is particularly suitable for the plate which plate may be easily connected to the tinned connecting wires. Equally suitable is a plate which is made up of two layers consisting respectively of tin alloys having different melting points. This enables the plates to be produced in a simple fashion, by pouring the tin alloys into molds, and also prevents the base elements from sinking too far into the plate. A convenient form of this type of anchorage is one in which the connecting wires are approximately 0.8 mm thick, in which the vases project from bases last covering foil through which they are fused over a length of approximately 1 mm to a maximum extent of approximately 150 $\mu$, and the plates have a size of $2 \times 2 \times 0.5$ mm. For applications as a chip capacitor in an integrated circuit, it is advisable for a capacitor of the above-described variety to have connecting wires which do not project beyond the foils in the longitudinal direction, and which wires at least in portions of their length are not completely surrounded by the synthetic resin material of the cover or dielectric foils so that a part of their periphery is exposed.

In order to produce a capacitor according to the invention, it is possible to use a very simple process. This process fundamentally comprises the steps of forming a capacitor strip or stack by continuously applying to a thermoplastic carrier foil, a strip-shaped metal coating or layer, a dielectric foil, and a second metal coating or layer and, if desired, additional dielectric and metal layers one after the other while leaving exposed free edge zones of the foils, in such a manner that each successive metal coating is laterally displaced relative to the preceding layer. The capacitor strip or stack is then conveyed to a contacting station where it is covered by a thermoplastic cover foil, connecting wires are applied to the outer surface of the cover foil to run respectively along the free edge zones; and each wire is electrically connected to the two poles of a current source, whereby each of said wires is heated by the electric current and is fused through the thermoplastic cover foil, the dielectric layers and the edge zones of the metal layers of a respective polarity into the carrier foil and thus connected in a mechanically stable and electrically conductive fashion to the layers of said respective polarity by the formation of an alloy in the contacting zone. Thereafter, the capacitor is separated from the strip by cutting or separating above a line extending transverse to the strips longitudinal direction. If desired, before or after the fusing-in of the wires, the layer arrangement may be divided in the longitudinal direction.

This process has the advantage that when the capacitor foil and the cover foil have initially been produced in the correct width, only one further operation is necessary for the production of the capacitor. In a capacitor produced in accordance with the invention, the carrier foil serves as one of the cover foils. A precise guidance and accurate positioning of the indivdual strips relative to one another, and consequently a good exploitation of both space and material, is achieved if a first cover foil is a capacitor strip which is composed of oppositely pole metal layers and dielectric layers and a second cover foil are fed from the same direction, and the connecting wires are fed from the opposite direction under appropriate pairs of electrodes. Each of the connecting wires is heated by one pair of electrodes and fused into the cover foil and dielectric layers.

An improved protection of the foil edges is achieved if the first cover foil takes the form of a carrier foil to which the metal layers and dielectric layers are applied, and the second cover foil projects beyond the carrier foil in the longitudinal direction as the foils are fed under the electrodes. After the wires have been fused into the foils the carrier, the first cover foil is cut off relatively closer to the contacting point, and the second cover foil is cut off relatively further from the contacting point.

By varying the relative positions of the dividing cuts, it is possible to adjust the capacitance. If frequent changes in capacitance values are required, it is advantageous for the cover foils, the metal layers and the dielectric layers to be first joined to one another and fed as a foil strip to the contacting station, and, after the connecting wires have been fused in the capacitors so formed is separated in the requisite lengths from the foil strip. The outlay in terms of apparattus for this purpose is particularly low since the fixing of the position of the individual foils relative to one another during the fusing-in of the connection wires and during the division of the capacitors has already been effected by the initial joining of cover foils, metal layers and dielectric layers. The separation of the foils can conveniently be effected by punching or by fusion.

If a carrier foil is used having a width, which is a multiple of the width of one capacitor, and if the carrier foil is provided with metal coatings applied in a plurality of strips in the longitudinal direction of the foils with the width of the individual strips being that required for the capacitor, and if the strips are separated from one another by uncoated stips, with the metal layers of each strip being mutually displaced, it is possible to produce a number of capacitors in one operation by placing or joining a cover foil onto the coatings and dielectric layers of the carrier foil. The capacitor strip so formed is divided up in its longitudinal direction either before or after the fusing-in of the connecting wires behind the contacting points, and is divided up perpendicular to this direction after the fusing-in of the connecting wires.

In such a capacitor, the dielectric layer or layers only need have the thickness required for the electrical values of the capacitor when the dielectric layer is produced by the application of a lacquer layer to a metal coating or layer arranged on a carrier foil. If particularly small dielectric thicknesses are desired, it is advisable to produce the dielectric layers by a glow polymerization, in particular by using starting monomers which are fully fluorinated. The application of protective layers by polymerization in the glow discharge possesses the advantage that the layer adapts well to microscopic unevenness in the substrate (which may not be the case with a lacquer, for example, where the solvents used may damage the capacitive layer). It is possible to produce a somewhat thicker dielectric without having to have an air gap in the electric field in a capacitor according to the invention. If the dielectric layer which is used as a self-supporting thermoplastic foil which is metalized on one side with an exposed free edge zone is joined to the first metal layer, the metalization of this foil forms the oppositely poled metal layer. A good connection between metal layer and connecting wire is provided if, in the region of the cut edges, one free edge zone of the one layer is always applied over a strengthened edge zone of the other layer.

Easy handling of the capacitors until they are set in use, and an improved protection of the coatings from mechanical damage, for example, during the use of the capacitors, or as a result of externally applied etching substances, for example, during manial soldering, may be provided by a process in which a capacitor foil having the width necessary for the capacitor, and a cover foil (both of which have a greater length than is actually required in the capacitor) are moved, from directions lying at right-angles to one another, so that the cover foil extends somewhat further than is necessary for it to completely cover the width of the capacitor foil, but, on the other hand, the capacitor foil does not completely cover the width of the cover foil. The connecting wires are led to the contacting points parallel but from the opposite direction to the movement of the capacitor foil, and, after each contacting step, the capacitor foil is divided, whilst the cover foil is merely perforated along its entire width outside the area at which it overlaps the capacitor foil along a line running at right-angles to its longitudinal direction. Then, the cover foil is displaced in its longitudinal direction by an amount equal to the length of the thus bonded cover foil of a capacitor. Consequently, a strip of connected capacitors is produced from which individual capacitors can be separated by tearing or cutting as required. In this case, pieces are cut from the capacitor foil which are shorter than the corresponding piece of the cover foil so that the edges thereof do not coincide with those of the cover foil, and consequently the cover foil projects beyond the capacitor foil on all four sides, and thus offers all-round protection against damage.

In order to provide the connecting wires with bends which are perpendicular to the plane of the layers, without preliminary profiling, the diameter of the connecting wires, the distance apart and the pressure of the electrodes and the heating period during the fusing-in of the wires are so selected that the part of the particular wire lying below the electrodes is fused through the upper cover foil, the dielectric layer or layers and the metal layers into the underlying cover foil, but that the wire bends between the electrodes are only embedded into the stack as far as the first metal layer to be contacted. In order to ensure that the capacitor is damp-resistant and resistant to organic solvents, the dielectric preferably consists of a layer of fully fluorinated hydrocarbons which are polymerized by glow discharge onto the metal layer or layers. Morevoer, in order to protect those surfaces of the metalizations which are not connected by material locking to the synthetic resin layers from dampness, thin layers of a fully fluorinated hydrocarbon, in particular hexafluoropropylene, may be polymerized onto these surfaces. This can be effected in a particularly advantageous manner if the metalized foils are already opened up.

If the connecting wires are to be contacted over a relatively long distance, it is advantageous to apply pressure in a direction perpendicular to the foil surface on the relevant connecting wire between the electrodes at one or more places, so that the connecting wire is thus fused through the dielectric layer or layers and metal coating or coatings into the underlying covering foil at one or more points between the electrodes and so that the wire bends between each two of these points does not penetrate any further than the first metal layer which is to be contacted. A further improvement in the mechanical fixing is obtained if the connecting wires are bent into an undulating shape in the region to be contacted before they are fused in. If the bends, which are so formed are aligned parallel to the covering foil before the fusing-in step, during the fusing-in step, the connecting wires may be given a helical or spiral form by exerting pressure at the appropriate points on the connecting wires. The most suitable distance apart for the points on the connecting wires at which pressure is to be exerted in this manner is in the range of from 0.5 mm to 3 mm. The amplitude of the bends in the connecting wires, measured along a surface, preferably lies in the range of 50 to 500 $\mu$, and by taking into account the tolerances of the connecting wires, the bends and the foil tolerances, it is still possible to press the troughs of the bends into the underlying cover foil, while the regions between the troughs penetrate no further than the first metal layer to be contacted. The upper limit of 500 $\mu$ is dictated by the fact that at the intervals between bends which are of interest in connection with capacitors, very small, well contacted zones can be achieved even with such a large amplitude. If the bends are to be spaced from one another by more than 2 mm, the connecting wires are preferably formed from a low melting aluminum or tin bronze, and, during the fusing-in step, the wires are heated to above their softening point and thus pressed into the desired shape.

If good contact zones are to be produced at a distance or spacing which is short in relation to the thickness of the connecting wire, then a suitably shaped profile is advantageously embossed onto the connecting wires, before the fusing-in step. A sinusoidal profile has been found to be particularly favorable for this purpose. In order to ensure an accurate distance from the outer surface of the underlying covering foil, it is advantageous to use both a profile having a wave-shaped section and base elements which project past the wave-shaped section which base elements is fused through all the foils during the fusing-in step. The base elements determine the distance of the wave-shaped profile from the outer surface of the last cover foil to be reached by the wire. Additional fixing of the connecting wires in the foils can be achieved by fusing the base element onto metal plates after the base elements have passed through all the foils.

An accurate determination of the depth of penetration of the connecting wires can also be achieved by cooling the cover foil which is the last to be reached by the connecting wires, during the fusing-in step.

To improve the connection between the metal coating or layers and a connecting wire after the fusing-in step, a very short current surge of high current density is passed through the capacitor which surge is sufficient to form local melting in particular the contacted, electrically conductive layer without damaging the capacitor. To accomplish this treatment, the capacitor is advantageously charged to an appropriately high electric voltage and is subsequently discharged via a circuit whose inductance and resistance is as low as possible.

If an additional fixing of the capacitor and securing of the connecting wires is required, a strip of synthetic material, which extends in a direction perpendicular to the wires, may be inserted on the wires. This is accomplished preferably before the fusing-in step by inserting the strip between the electrodes, which contact the wires and which electrodes fuse the strip to both the connecting wires and the cover foils during lhe fusing-in step.

To carry out a process for manufacturing capacitors according to the invention, an apparatus may be used which comprises one or more rams which are arranged between two electrodes that contact one connecting wire. The rams possess non-electrically conducting, cylindrical end faces, and are functionally connected to means for moving the electrodes. These rams can be used to press the heated wire between the electrodes into the synthetic resin material or can also be used to cool a wire which has previously been provided with a predetermined profile, at its thinner points. They will also prevent a wire which has already been provided with a suitable profile from bending to an undesirable profile. Because of the use of non-conductive material, no shunt effect on the heated wire occurs. If a relatively large distance exists between the bends which are to be impressed or formed on a connecting wire, it is advisable to use a ram which has a sinusoidal end face. For relatively short distances between the bends, the ram can take the form of cylindrical rods arranged parallel to the cover foil. By spacing these rods apart at the appropriate distance, the connecting wire can be bent into an approximately sinusoidal shape when it is pressed into the cover foil. The end face of each ram or each ram is preferably made of a ceramic which can, if desired, be coated with a layer of synthetic resin material of poor wettability (e.g., a polyimide lacquer). It is also advantageous to employ a suction device which acts in the immediate vicinity of the electrodes and thus protects the electrodes from the accumulation of insulating materials which accumulation is formed during the powerful local heating of the foils by the connecting wire, which wire may be heated to a red heat.

In order to be able to weld the capacitor all round in water-tight fashion, a heatable metal ram may be provided which is arranged to be movable relative to a cooled metal base, and which ram has a narrow side or edge which can be pressed onto a foil disposed between the metal ram and the metal base, and which edge or side is so dimensioned that it is suitable for welding the edge zones of the capacitors on all sides. The ram is expediently coated with a layer of polytetrafluoroethylene and provided with a cutting edge which lies outside the narrow side and is suitable for cutting the capacitor to the desired size.

In place of the ram, it is also possible to use, in particular, for the welding of polyethylene terephthalate, a probe-shaped sonotrode which is adapted to carry out ultrasonic welding and which can be used to exert a pressure onto the foils during the ultrasonic welding process. This sonotrode is also expediently supplemented by a cutting device arranged beyond the probe, which device is suitable for cutting the capacitor to the desired size. The synthetic resin component referred to above can also advantageously be welded onto the wires and foil by the probe.

In FIGS. 5–11, several of the above mentioned embodiments of the capacitor of the present invention and the apparatus for preforming the method of the present invention are illustrated.

Figure 5:
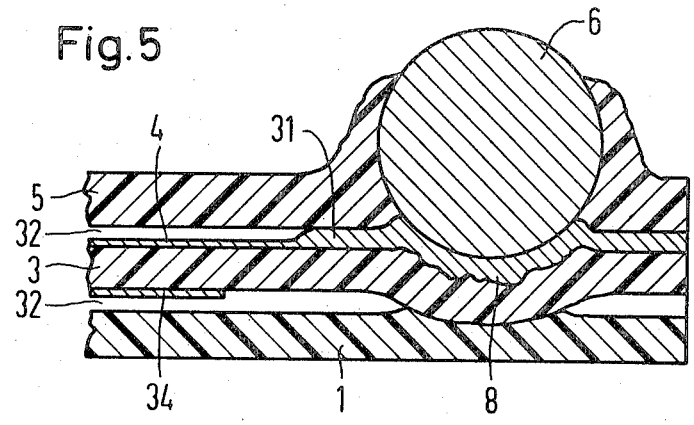
FIG. 5 is a schematic sectional view of part of another form of capacitor in accordance with the invention.

In FIG. 5, a first covering foil 1, a dielectric foil 3 which is coated on both sides with metal layers 4 and 34, which are provided by a metalization process, and a second cover foil 5 are connected to one another by fused-in wire 6. An alloy zone 8 integrally connects the wire 6 to the reinforced edge portion 31 of the coating 4. Between each of the metal layers 4 and 34, and the adjacent dielectric foils 5 and 1 are arranged air gaps 32 which improve the regenerability of the layers 4 and 34 by providing oxygen.

Figure 6:
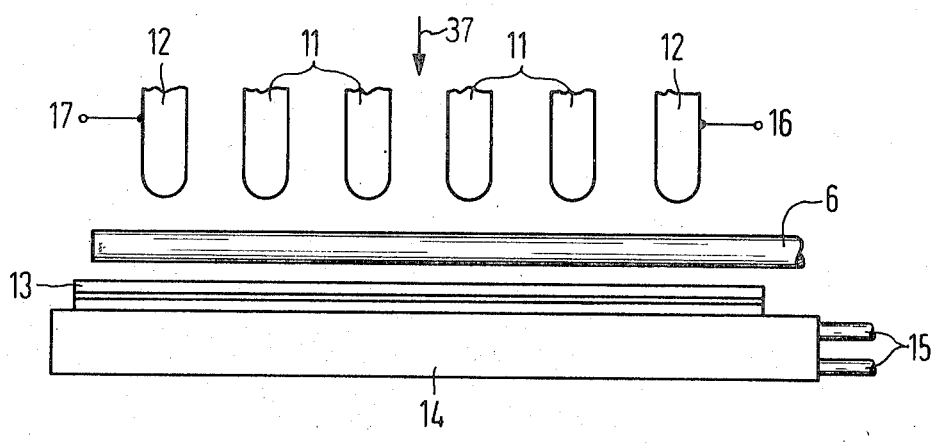
FIG. 6 is a schematic side view of an apparatus for contacting a capacitor in accordance with the invention.

If the connecting wires are to be bent in a direction perpendicular to the planes of layers during fusing-in process, then an arrangement as shown in FIG. 6 can advantageously be used. On a cooled metal plate 14, which is provided with tubes 15 for a coolant, lies a capacitor foil 13 consisting of cover foils, dielectric and metal layers, over which foil 13 a connecting wire 6 is positioned. Two rams 12, consiting of electrically conductive material, are connected via terminals 16 and 17 to the two poles of a current source and serve as electrodes for the contacting of the connecting wire 6. Rams 11, which are spaced between the rams 12, are made of an electrically non-conductive material, and are a ceramic. The rams 11 and 12 each have a cylindrical end face, and the part of the cylinder which comes into contact with the connecting wire 6 has the cross-sectional form of a segment of a circle.

By moving the rams 11 and 12 in the direction of the arrow 37, the connecting wire 6 is contacted, heated and pressed into the capacitor foil 13. As a result of the counter pressure of the capacitor foil 13 lying on the metal plate 14, the wire 6 is so pressed between the rams 11 and 12 that the wire is given a wave-shaped configuration. Cooling from the cooling plate 14 ensures that the penetration of the heated connecting wire in the lower region of the foils 13 is slowed down, and thus the depth of penetration is limited for a given duration and current strength of the current, which is applied through the connecting wires 16 and 17, and with a given pressure on the rams 11 and 12. This compensates for any deviations from the given data.

Figure 7:
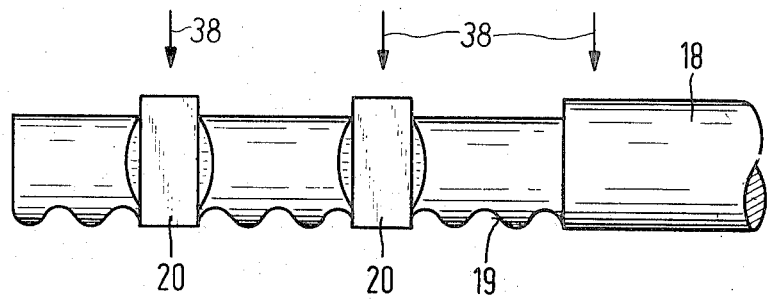
FIG. 7 is a side view of one form of connecting wire for use in the invention.

FIG. 7 shows a connecting wire 18, having an undulating profile 19 and base elements 20 attached thereto. The undulating profile 19 has been produced by compression. Its wavelength is relatively small in comparison with the diameter of the wire. If the connecting wire 18 is fused into the foil in the direction of the arrows 38, with the position of the pressing rams being preferably at the points indicated by the arrows 38, then the base elements 20 are pressed right through all of the layers of the capacitor and through the underlying cover foil. Thus, the base elements 20 determine the depth of penetration of the undulating profile 19 into the foil 13.

Figure 8:
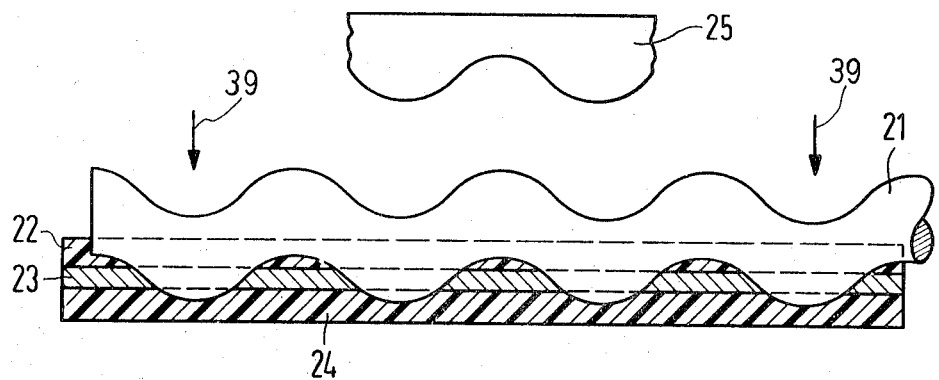
FIG. 8 is a schematic side view of a capacitor according to the invention illustrate the use of an undulating connecting wire.

FIG. 8 shows cover foils 22 and 24, with an interlying coating or layer 23 into which has been fused a connecting wire 21. The direction of pressure and the position of the electrodes being indicated by the arrows 39. During the fusion or fusing-in process, a ram 25 has pressed between the electrodes onto the wire, and the end surface of the ram is so shaped to provide the wire, which is close to its softening temperature, with an approximately sinusoidal profile.

Figure 9:
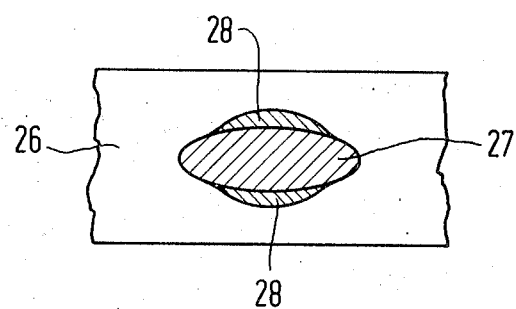
FIG. 9 is a schematic plan view of a metal coating of a capacitor according to the invention through which part of a sinusoidal connecting wire has passed.

FIG. 9 shows a metal coating 26 which has an alloy zone 27 and zones 28 of synthetic resin material filling the gaps such as gaps 7 (FIG. 4). The greater the length of the boundary of the alloy zone 27 bordering directly on to the metal coating 26, the lower the contact resistance between the connecting wire and the coating 26.

Figure 10:
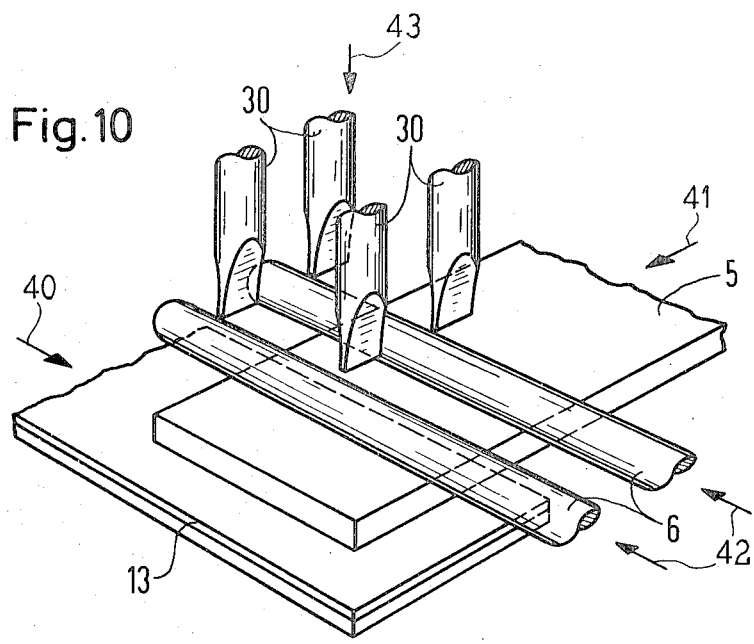
FIG. 10 is a schematic perspective view of the components of a capacitor according to the invention to illustrate one method of manufacturing such a capacitor.

In the arrangement shown in FIG. 10, a capacitor foil 13, made up of a cover foil, dielectric and metal layers, and a cover foil 5 are moved from directions at right-angles to each other as indicated by the corresponding arrows 40 and 41, respectively, so as to lie one above the other. The connecting wires 6 are moved in a direction of arrows 42 parallel to but opposite that of the movement of the capacitor foil 13, over the cover foil 5. By pressing electrodes 30 in the direction of arrow 43 onto the wires 6, the wires are traversed by a current, and consequently heated and fused through the cover foil 5 into the capacitor foil 13.

Figure 11:
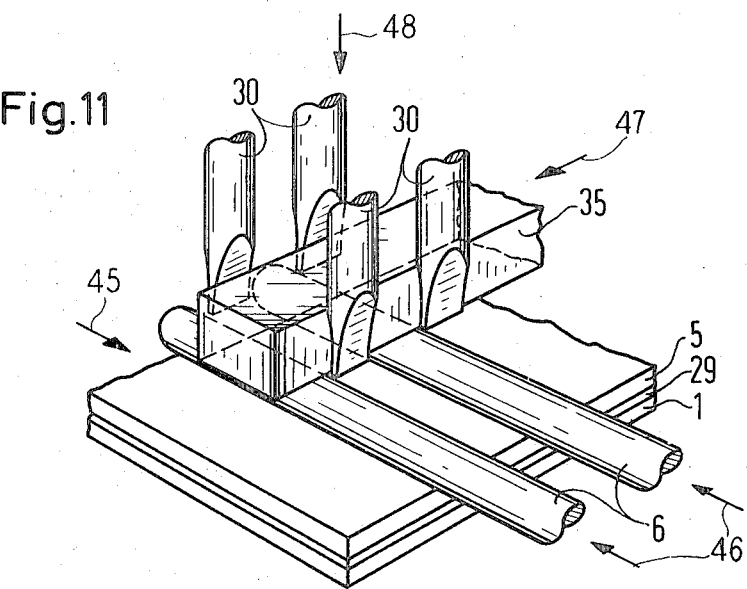
FIG. 11 is a similar view to that of FIG. 10 to illustrate another mehtod of manufacturing a capacitor according to the invention.

In the arrangement of FIG. 11, two cover foils 1 and 5, and an interlying capacitor foil 29, which is composed of metal layers and at least one dielectric layer, are moved in one direction (arrow 45) and two connecting wires 6 are moved from the opposite direction (arrows 46) so that the wires lie above the foils. A strip of synthetic resin material 35, which extends in a direction indicated by arrow 47 and perpendicular to the connecting wires 6 and which is to be applied to the connecting wires 6, is inserted between the four electrodes 30. If the electrodes 30 are now pressed onto the wires 6 in the direction of the arrows 48, the wires 6 are fused into the foils 1, 5, 29 and the strip of synthetic resin material 35 is simultaneously fused to the wires 6 and the cover foil 5. This provides an additional securing of the connecting wires 6 and fixing of the capacitor.

Although various minor modifications might be suggested by those versed in the art, it should be understood that we wish to employ within the scope of the patent warranted herein all such modifications as reasonably and properly come within the scope of our contribution to the art.

We claim:

1. An electrical capacitor comprising at least two aluminum metal layers, a dielectric layer of synthetic resin material interposed between each adjacent pair of metal layers, said metal and dielectric layers being substantially flat and arranged between a first and second outer cover foil to form a stack, with each of said metal layers, which serves as one electrode of the capacitor, extending to one edge of the stack but not to the opposite edge so as to leave a metal-free edge zone at said opposite edge, and each of said metal layers, which serves as the other electrode of the capacitor, extending to said opposite edge but not to said one edge of the stack, so as to leave a metal-free edge zone at said one edge, and a connecting wire extending longitudinally on said first cover foil along each of said metal-free edge zones, at least specific points on the length of said wires being fused through said first cover foil and the dielectric layer into electrical contact with the metal layer in the edge zone by an alloy zone between the metal layer and wire so that the wires are mechanically stably secured therein and at least one wire is mechanically stably secured to each of the two cover foils the dielectric layer and the metal layer extendng into said edge zone therebeneath two cover foils, the dielectric layer and the metal layer extending into said edge zone therebeneath mechanically connected in a stable manner.

2. A capacitor according to claim 1, wherein at least one of said two cover foils has a thickness sufficient to provide the mechanical resistance necessary for handling of the capacitor.

3. A capacitor according to claim 1, wherein the stack is held together solely by said wires.

4. A capacitor according to claim 1, wherein each of the metal layers forming the one electrode has a regenerably thin, capacitive zone having a surface conductiviity of at most 3 mho and a reinforced contacting zone having a surface conductivity of approximately 15 mho, and each of the metal layers forming the other electrode is a non-regenerable layer with a surface conductivity of approximately 15 mho.

5. A capacitor according to claim 1, wherein said first cover foil is a thermoplastic foil having a short-term thermal resistance which is lower than the short-term thermal resistance of the second cover foil.

6. A capacitor according to claim 5, wherein said first cover foil is made of polyethylene terephthalate, and the second cover foil is made of a polysulphone having a melting point of above 200°C.

7. A capacitor according to claim 5, wherein the second cover foil which has a higher short-term thermal resistance is composed of two layers with one layer being a thick layer having a relatively low short-term resistance and the other of the two layers, which face the metal layer, being a thin layer of approximately 1 $\mu$ in thickness and of a material having a relatively high short-term thermal resistance.

8. A capacitor according to claim 1, wherein each of said connecting wires is deformed in the region in which it is in contact with the metal layer.

9. A capacitor according to claim 8, wherein said connecting wires are of a material selected from a group consisting of tinned nickel-silver, bronze, and copper, said wires are tinned and have a diameter of approximately 0.7 mm, and wherein each of said wires is passed in at least two places through the metal layer extending therebeneath and embedded into the second cover foil with the adjacent points being spaced apart at approximately 2 mm.

10. A capacitor according to claim 9, wherein the surface of each wire intermediate said points, which surface faces the stack, is embedded in the stack only as far as the nearest metal layer.

11. A capacitor according to claim 8, wherein said connecting wires are made of a material selected from a group consisting of tin and aluminum bronze which material has a relatively low melting point, and said wires have a diameter of more than 0.7 mm, and wherein each of said wires is passed in at least two places through the metal layer extending therebeneath and embedded into the second cover foil with the adjacent points being spaced apart at a distance of more than 2 mm.

12. A capacitor according to claim 11, wherein the surface of each wire, which surface faces said stack, intermediate said points is embedded in the stack only to the nearest metal layer.

13. A capacitor according to claim 1, wherein said second cover foil has a thickness of approximately 50 $\mu$, which foil supports said metal and dielectric layers which layers have a total thickness of only a few $\mu$, wherein said first cover foil has a thickness of approximately 190 $\mu$, and wherein said connecting wires have a 0.8 mm diameter and are provided with an undulating profile with a profile depth of approximately 250 $\mu$.

14. A capacitor according to claim 1, wherein said stack includes up to six metal layers separated from one another by dielectric layers having a thickness of 50 $\mu$, said metal layers extending alternatively to opposite edges of the stack, each of said connecting wires being connected in a mechanically stable and electrically conducting manner to all of the metal layers extending into the edge zone therebeneath to form one of the capacitor electrodes.

15. A capacitor according to claim 1, wherein a plurality of dielectric layers is present in the stack, and wherein the edge zones of said dielectric layers are welded to one another to provide a water-tight peripheral weld seam.

16. A capacitor according to claim 1, wherein said dielectric layer is a polypropylene foil of 100 $\mu$ thickness which is provided on both sides with metallized coatings to form said metal layers, and wherein each of said covering foils has a thickness in the range of 50 to 300 $\mu$.

17. A capacitor according to claim 1, wherein at least one of said cover foils consists of a polysulphone having a melting point of more than 200° C., wherein one of said metal layers is a vapor-deposited coating on said one foil, and wherein said dielectric layer is made of polyphenylene oxide which is mechanically connected to said one metal layer and carries another metal layer.

18. A capacitor according to claim 1, which includes at least one synthetic resin component which extends transversely to the connecting wires, and which component is fused to said first cover foil adjacent to said connecting wires so as to encase said wires.

19. A capacitor according to claim 1, wherein said first cover foil is approximately 190 $\mu$ thick and consists of polyethylene terephthalate, wherein said second cover foil has a thickness of 50 $\mu$ and is a material selected from a group consisting of polyethylene terephthalate, polysulphone, polycarbonate, and polystyrene, wherein one metal layer is provided by a metal coating on said second cover foil, wherein said dielectric layer has a thickness of approximately 1 $\mu$ and consists of polypheneylene oxide applied on said second cover foil over the metal coatings, and wherein a second metal layer is a coating applied to said dielectric layer.

20. A capacitor according to claim 1, wherein each of said connecting wires has at least one base element attached thereto, and wherein said base elements extend through all the layers of the capacitor.

21. A capacitor according to claim 20, wherein each said base elements projects through the second cover foil for a distance of up to 150 $\mu$ and which includes a plate mechanically connected to the projecting base elements.

22. A capacitor according to claim 1, wherein said connecting wires do not extend beyond the edges of the cover foils and are partially but not completely surrounded by the synthetic resin material of said covering and dielectric foils.

23. A process of manufacturing a capacitor comprising the steps of providing a first and second cover foil, at least two metal layers, and at least one dielectric layer, arranging the metal and dielectric layers between the first and second cover foil with a dielectric layer interposed between adjacent metal layers to form a substantial flat stack with adjacent metal layers being offset relative to each other so that each metal layer has a free edge zone which is not covered by an adjacent metal layer, positioning a connecting wire over the first cover foil to overlie each of the two free edge zones, and applying heat and pressure to each of the wires to fuse at least a portion of each of the wires through the first cover foil and into an electrical connection with all metal layers disposed therebeneath and to fuse at least a portion of one wire to the second cover foil.

24. A process according to claim 23, which includes subsequently applying a higher electrical voltage across the connecting wires to melt local areas of the metal layers adjacent the connecting wires without damaging the remaining metal layers and then subsequently discharging the high voltage through a circuit which has an extremely low inductance and resistance.

25. A process according to claim 23, wherein the step of applying heat and pressure applies pressure at spaced portions along each of the connecting wires so that portions of the connecting wires are fused into the stack to a greater depth than the remaining portions.

26. A process according to claim 25, wherein the step of applying heat and pressure is accomplished by passing a current through two electrodes forced into engagement with each connecting wire.

27. A process according to claim 26, wherein the step of applying heat and pressure further includes pressing non-conducting rams against each connecting wire intermediate the application of the electrodes so that the connecting wire is deformed as it is fused into said stack.

28. A process according to claim 26, which includes cooling said second cover foil during the step of applying heat and pressure to limit the depth of penetration of each connecting wire being fused into the stack.

29. A process according to claim 23, wherein the step of arranging comprises the step of arranging the metal and dielectric layers on the second cover layer to form a capacitor foil with each of the metal layers being in individual elongated strips with a spacing between the strips providing the staggered lateral offset, and then subsequently applying the first cover foil thereon to complete the assembly of the stack.

30. A process according to claim 29, wherein during the step of applying heat and pressure, the stack is moved in one direction, and the connecting wires are moved in an opposite direction under a pair of electrodes for each of the respective wires, said electrodes being reciprocated to engage the respective wires to apply heat and pressure thereto.

31. A process according to claim 30, wherein the capacitor foil has a width corresponding to that of the finish capacitor, and the first cover foil has a length greater than is required in the finish capacitor, said first cover foil and capacitor foil being moved in directions extending perpendicular to each other so that the first cover foil extends somewhat further than is necessary for it to entirely cover the capacitor foil which does not entirely cover the width of the first cover foil, wherein the positioning of the connecting wire is accomplished by moving them parallel and opposite to the direction of movement of the capacitor foil, and which process further includes a subsequent step of removing portions of the capacitor foil subsequent to the step of applying heat and pressure so that the first cover foil extends past the edges of the capacitor foil, and the step of providing perforations extending across the first cover foil adjacent the edge of the capacitor foil so that a finished capacitor can be separated by tearing said perforations.

32. A process according to claim 30, wherein the step of appying heat and pressure, includes controlling the amount of pressure and heat so that each of the contact wires have portions which are fused into the stack a greater distance than other portions, said first mentioned portion being fused through the metal and dielectric layers while the other portions penetrate only to a depth of the first metal layer to be contacted.

33. A process according to claim 29, wherein a thin layer of fully fluorinated hydrocarbon is polymerized on a surface of each metalization which is not connected in material locking fashion to a synthetic resin layer.

34. A process according to claim 32, wherein said fully fluorinated hydrocarbon is hexafluoropropylene.

35. A process according to claim 23, which further includes prior to the step of applying heat and pressure the step of assemblying a strip of synthetic resin on the connecting wires to extend perpendicular thereto, wherein said step of applying heat and pressure is accomplished by placing electrodes adjacent to the synthetic strip to contact each wire, said electrodes heating the wire for fusing into the stack and fusing the strip to the connecting wires and the first cover foil.

* * * * *